Nov. 4, 1958
J. S. BAKER
2,859,390
STRAND TYPE TERMINAL BOX
Filed Aug. 4, 1954
3 Sheets-Sheet 2
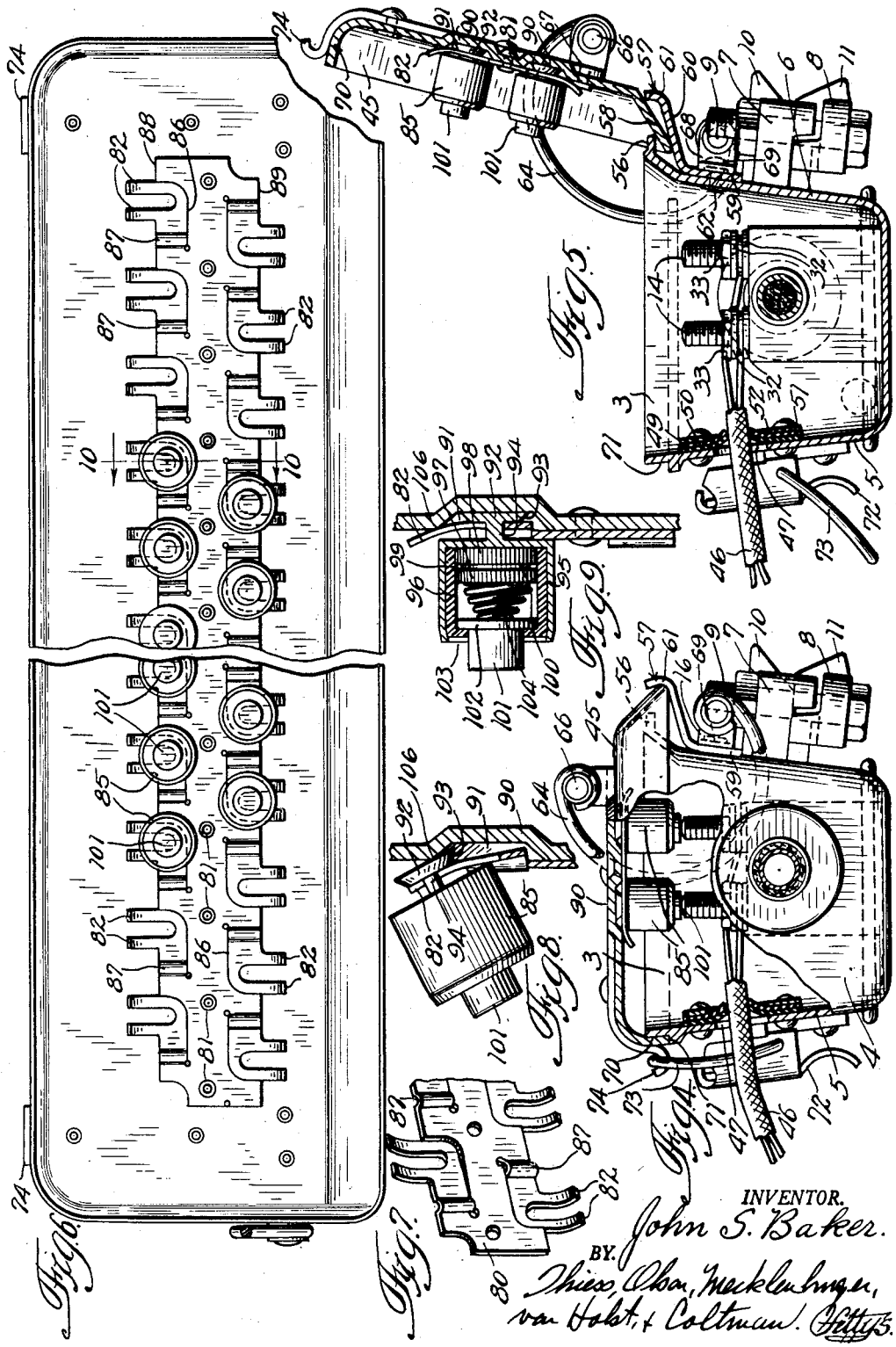
INVENTOR.
John S. Baker.

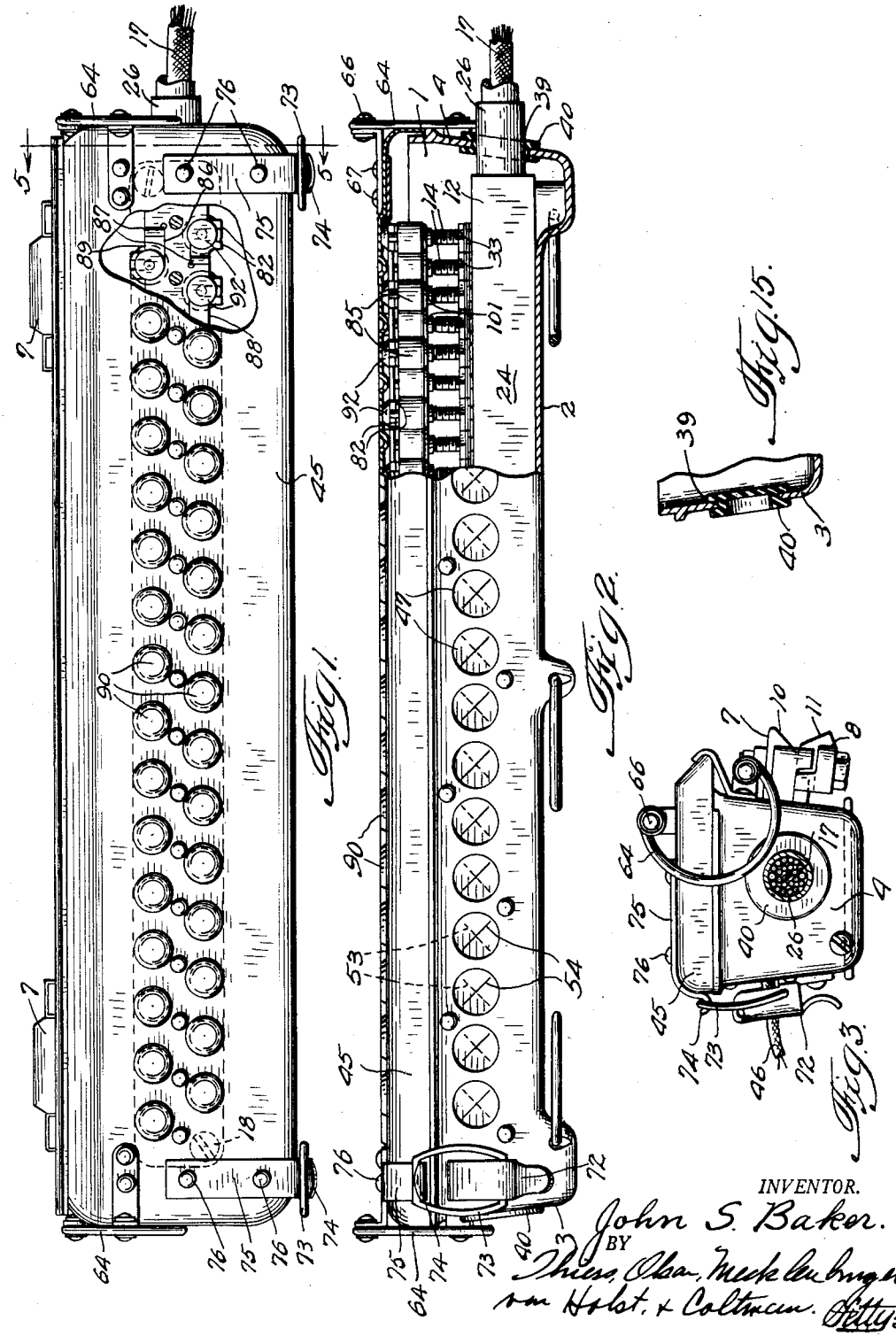

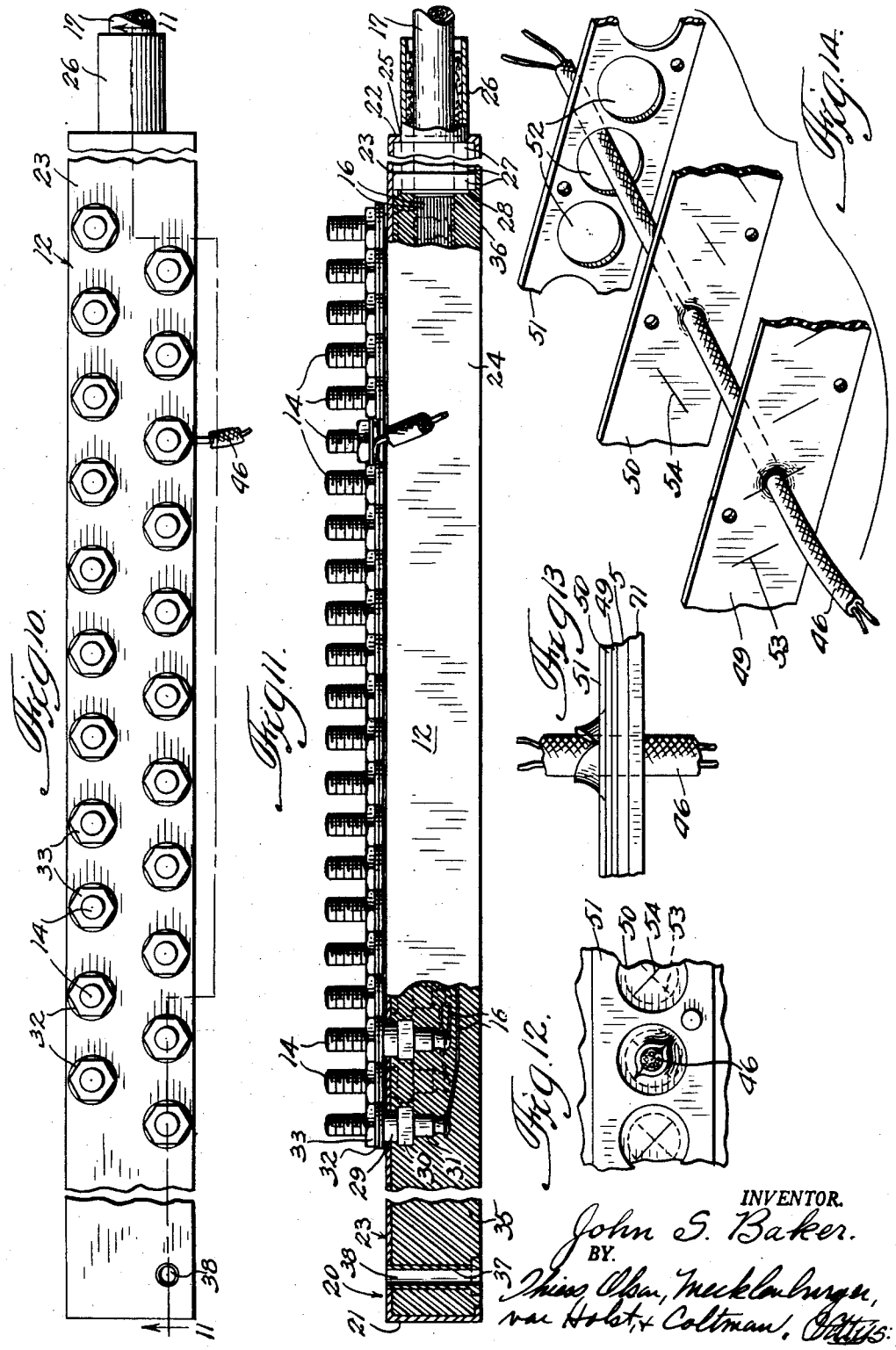

United States Patent Office 2,859,390
Patented Nov. 4, 1958

2,859,390

STRAND TYPE TERMINAL BOX

John S. Baker, Skokie, Ill., assignor, by mesne assignments, to Cook Electric Company, Chicago, Ill., a corporation of Delaware Application August 4, 1954, Serial No. 447,753

4 Claims. (Cl. 317—69)

This invention relates to cable terminals and more particularly to terminal boxes for electric cables adapted to be mounted adjacent telephone poles and other like supports, carrying telephone line cables, to provide for ready connection to the drop wires leading to subscribers' instruments.

Terminals of the character referred to are usually mounted on poles where it is difficult to work if the parts are not readily accessible. Usually, it is desirable to protect the cable against the entrance of moisture by providing a moisture-tight chamber or compartment into which the cable may be extended and its wires distributed to the terminal of posts or studs of subscribers' lines. However, it is preferable that these terminal posts or studs are readily accessible in order to permit making the necessary changes in and additions to the wiring connections that must be made at different times to correspond to changes in and additions to the customers' lines. These terminal posts or studs are generally provided to receive the cable wires at one end and to receive the drop wires leading to the subscriber's instruments at the other end. In certain instance, it is desirable to protect the equipment against injurious current that may surge through the lines at times by providing high potential arresters or discharger protection. The need for it may not be apparent until after the original installation or until additional subscriber's lines are added.

The arrangement of the parts effecting this moisture seal for the cable at its end from which the wires extend has heretofore required the use of costly and sometimes intricate structures usually found, however, to be unsatisfactory, particularly from the standpoint of easy access to the terminal and connections thereto by linemen braced in hazardous positions on telephone poles, making the aforesaid changes in the wiring connections between subscribers' lines and cable wires. Moreover, this arrangement of parts required the mounting of the terminal box in a position on the pole permitting linemen to step thereon while climbing about on the pole which is undesirable and may cause damage to the terminal. When the terminal box is mounted on the pole, replacement of the pole itself quite often resulted in a disturbance of the connections because if the new pole failed to be spotted exactly like the old pole, adjustment of the connections to the terminal box had to be made.

One of the objects of the invention is to provide a terminal box of improved construtcion having, as one of its features, an improved arrangement of parts whereby the terminal box is provided with a container adapted to be secured preferably to the floor of the terminal box and to receive the cable at one of its end walls. From the front wall of the container, the terminal posts are adapted to project and, therefore, be readily accessible in a very simple and efficient manner for receiving the drop wires leading to the subscriber's instruments and for permitting the making of necessary changes in and additions to these connections. These terminal posts also extend into the container to receive the cable wires. An insulating compound may then be used to fill the container and to embed the cable wires and their connections to the terminal posts, and also be embed the open end of the cable in this compound to seal these parts effectively from moisture and atmosphere. The sheath of the cable may advantageously enter the end wall of the container through a nipple held in position in the end wall by a lock ring. The simple and inexpensive arrangement of parts quite obviously results from the fact that there is no need to provide planar mating surfaces and gaskets to secure a moisture seal for the chamber receiving the cable wires and their connections to the terminal posts. The chamber is simply obtained by making the container of sheet metal of channel cross section. After the cable wire connections to the terminal posts are made within, the insulating compound may then be poured into the channel to fill the container and obtain quite a permanent seal of all the parts therein.

Another important feature of the invention resides in the construction of the aforesaid terminal box employing a novel form of cover. This cover is adapted to be carried upon a floating mounting or connection and controlled by a spring arrangement providing an over-center snap action both in the opening and in the closing of the cover. A very simple mounting for a protector such as an arrester may be carried by the cover or auxiliary member. When the cover is closed, each arrester may have one of its electrodes firmly pressed against one of the terminal post ends and provide a ground for any abnormal surge of current through the lines. A novel form of spring plate mounting may be used to provide ready detachability for the arresters so that customers' drop lines not requiring protection or the terminal posts not being used need not be furnished with arresters, thereby saving the cost of equipment not being used.

A still further object of the invention resides in the provision of self-contained unitary or button-type arresters or dischargers which may be detachably and individually secured to said spring plate mounting and which may have spring terminals suitable to engage or operatively connect the arresters with the studs when the cover on the terminal box is closed.

A still further object of the invention is in the provision of an improved form of mounting that advantageously allows the terminal box to be suspended upon the wire supporting the telephone cable adjacent to the pole so that its connections need not be disturbed at any time the pole is replaced and not spotted exactly in the same location, the mounting remaining close enough to the new pole, however, to allow easy access to linemen braced on the pole.

Still further objects and advantages will appear from the description and claims to follow in connection with the accompanying drawings which illustrate, by way of example but not of limitation, an embodiment of the invention.

In the drawings:

Figure 1 is a top view of a terminal box embodying the present invention with a small portion of the cover broken away;

Fig. 2 is a side or face elevation of the terminal box, a portion of the box and cover being also broken away;

Fig. 3 is an end view of the terminal box with the cover closed;

Fig. 4 is a larger view of the end of the terminal box with a portion of the terminal box and the cover being broken away;

Fig. 5 is a transverse section of the terminal box with the cover swung to open position;

Fig. 6 is an enlarged view of the inside face of the cover to illustrate the spring plate mounting for the individual arresters;

Fig. 7 illustrates in perspective a portion of this spring plate arrester mounting to show the construction of the same to receive the individual arresters;

Fig. 8 is a detail view to illustrate how an individual arrester is inserted between the two spring fingers constituting the individual mounting of this spring plate for each said arrester;

Fig. 9 is a transverse section through an arrester and the portion of the spring plate mounting holding the same;

Fig. 10 is a detail view of the top of the container illustrating the terminal posts or studs projecting therefrom;

Fig. 11 is a sectional view of the container taken along line 11—11 of Fig. 10 and looking in the direction of the arrow;

Fig. 12 is a detail elevational view of the means used to effect a moisture seal where the customer's leads or drop wires enter the terminal box through the front wall thereof;

Fig. 13 is another detail view but looking down on the same from along the top edge of this front wall of the terminal box;

Fig. 14 is an exploded view of the parts providing this moisture seal; and

Fig. 15 is a sectional view through an end wall of the terminal box and a puncturable gasket seal to permit the cable to enter at either end.

Referring to the drawings, the cable termnial structure comprises a housing 1, preferably of metal, having a floor 2, end walls 3 and 4, a front wall 5 and a rear wall 6. Rear wall 6 has clamping members 7 secured thereto as illustrated in Figs. 1, 4 and 5. A second jaw member 8 of each clamp 7 is carried by a threaded bolt 9, which is in turn carried by clamping members 7. Clamping jaws 10 and 11 formed on members 7 and 8 function to mount the terminal structure on any suitable part such as the wire carrying the telephone cable. The terminal structure may, accordingly, be suspended horizontally along this supporting wire adjacent to the pole and be conveniently accessible to linemen braced on the pole but still in a position far enough from the pole not to be stepped on by linemen working on the pole.

A container 12 carrying a plurality of terminal posts or studs 14, to which the wires 16 of cable 17 are attached in sealed relation, is adapted to be mounted in housing 1 and secured in position by a screw 18 (Fig. 1) passing through container 12 at its far end and engaging in floor 2 of housing 1. Container 12 is shown in detail in Fig. 11. It comprises a casing 20, preferably of channel shape, with end walls 21 and 22, a top wall 23 and side walls 24. End wall 22 is preferably provided with an opening 25 through which a nipple 26 passes inwardly of container 12. A series of locking washers 27 pass over the end of nipple 26 within container 12. The end of nipple 26 is then swaged outwardly at 28 to hold locking washers tightly in position against the inside face of end wall 22 and upon nipple 26. Wires 16 continue into container 12 and are secured to the lower end of terminal posts or studs 14 in the usual way. Posts 14 are constructed with cylindrical portions 29 passing through openings in top wall 20 of container 12 and with square shoulders 30 and ends 31 to which cable wires 16 are attached in the usual way. Terminal posts have the usual washers 32 and lock nuts 33 for the purpose of securing the customer's drop lines leading into housing 1 through apertures in the front face 5 to be presently described. After the cable wires 16 are attached to terminal post ends 31, container 12 is preferably inverted and is filled with an insulating compound 35 which securely anchors terminal posts 14 in position and seals the connection between their ends 31 with cable terminal wires 16. This is clearly illustrated in Fig. 11. As shown in Fig. 11, insulating compound 35 also seals the open end of the sheath 36 of cable 17 so that the interior of this cable is effectively moisture-sealed at its connection to container 12. Also anchored in container 12 and insulating member 35 is a bearnig sleeve 37 forming a permanent protected opening 38 for screw 18.

Wall 4 of terminal housing 1 has an opening 39 through which nipple 26 passes. To provide a moisture-proof closure at this point, a rubber grommet 40 is inserted in opening 39, grommet 40 being initially furnished with a thin integral but removable closure face that is punched out when nipple 26 is mounted in position. Opposite end wall 3 of housing 1 (Fig. 15) may be furnished with a similar opening 39 and a similar grommet 40 so that the ends of telephone cable 17 may enter either end of housing 1.

With container 12 positioned upon and secured to floor 2 of housing 1 and cable 17 entering through either or both of end walls 3 and 4, terminal posts or studs 14 are readily accessible to permit making the necessary changes in and additions to the wiring connections that must be made at different times to correspond to changes and additions to the customers' lines when cover 45 is in open position, as clearly seen in Fig. 5. Customers' connections or drop lines 46 enter housing 1 through a plurality of openings 47 in front wall 5. As will be observed in Fig. 5, the wires of customers' connections 46 may be conveniently and easily attached to terminal posts 14 by the use of the usual washers 32 and the lock nuts 33. Each opening 47 is larger in diameter than that of wires 46. A moisture seal is furnished in openings 47 by means of a plurality of flexible strips 49 and 50 adapted to be clamped against the inside face of front wall 5 by a clamping plate 51 which also has a plurality of conductor openings 52 therein larger than the diameter of the drop wires 46. Each flexible strip is slitted as illustrated at 53 and 54 (Fig. 14). Slits 53 and 54 are cut at an angle with respect to each other, and, in the preferred form of the invention, these slits are cut preferably perpendicular to each other but of a lesser length than the diameter of the conductor openings 47 and 52 in front wall 5 and clamping plate 51. Customers' drop wires 46 are adapted to be pushed through the slits 53 and 54. The edges of slits 53 and 54, being flexible, will tend to conform the strips 49 and 50 at the slits to the contour of conductors 46. The manner in which flexible strips 49 and 50 tend to cling about the surfaces of these conductors is illustrated in detail in Figs. 5 and 14.

It will be observed in Fig. 5 that cover 45 is carried by a mounting that swings this cover completely out of the area over the open face of housing 1 to provide for maximum access to drop wires 46 and terminal posts 14. This mounting comprises essentially a hinge for cover 45 in the form of a pair of substantially parallel spaced flanges 56 and 57 between which edge or flange 58 of cover 45 rides or floats. Flange 56 is preferably formed on back wall 6 at or adjacent the top edge and either part way or the entire way of the length of this wall 6. Flange 57 is formed with a downwardly extending wall 59 fitting against the outside face of rear wall 6 near the upper edge thereof. Portion 59 then joins an upwardly and outwardly sloping portion 60 which terminates in an upwardly curved portion 61. The downwardly extending portion 59 is adapted to be secured to rear wall 6 by a plurality of rivets 62, this being shown in Figs. 4 and 5. A pair of coil springs 64 are employed to keep edge flange 58 of cover 45 in floating relation between flanges 56 and 57 and to bring cover 45 by an over-center snap action either to closed position, as shown in Fig. 4, or to open position, as shown in Fig. 5. One end of coil spring 64 is connected to brackets 66 attached at 67 to cover 45 (Fig. 5). The other end of coil spring 64 is attached to similar brackets 68 secured by rivets 69 to end wall 6. The locations of brackets 66 and 68 are such that this aforesaid over-center snap action will be imparted to cover 45 as it is moving either to closed or to opened position.

Cover 45 is preferably provided with a turned front flange 70 that rather tightly fits in a cutaway portion 71 in the upper edge of front wall 5 and side walls 3 and 4. In order to hold cover 45 in tightly clamped closed position to exclude rain and moisture, there is provided on the front face 5 a pair of spring clips 72 suitably hinged to permit hinge loops 73 to swing upwardly and over lips 74 on clip 75 riveted at 76 to cover 45 (see Fig. 2). The manner in which these clamping members 72 function is clearly illustrated in Figs. 2 and 4.

The terminal structure disclosed herein is further novelly provided with a spring plate 80 riveted at a series of points 81 to cover 45 along its inside face. Spring plate 80 is uniquely designed and formed to provide a series of integral cliplike fingers 82 arranged in pairs to removably receive arresters 85. Plate 80 is preferably a sheet metal stamping that is cut at a plurality of determined points 86 and then formed with curved portions 87 so that each portion 87 forms an integral springlike mounting for said spring fingers 82. In forming plate 80, these fingers 82 extend beyond top edge 88 and bottom edge 89 of this plate. Fingers 82 are also curved slightly outwardly. Top cover 45 is also formed with rows of upset portions 90 to provide pockets 91 directly behind each pair of spring fingers 82, as illustrated in Figs. 8 and 9.

Individual arresters or dischargers 85 are each provided with a disk 92 having a tapered surface 93 and an extending reduced neck 94 that is integral or at least carried by housing 95. Within housing 95 is mounted an insulation casing 96 within which casing 96 and housing 95 are located spark gap electrodes 97 and 98 and a dielectric ring 99 between them. The electrodes may be of the same material and size and are preferably small circular disks of suitable high grade carbon. The inner or bottom electrode 98 fits and is seated in the bottom of outer housing 95 and therefore is in good contact therewith. Dielectric ring 99 may be in the form of a thin ring of Celluloid or other suitable material with a comparatively large circular opening 100 in the midsection and its outer periphery is in direct contact with the inner insulating unit 96. By this arrangement the inner electrode 98 is positively separated by the insulating dielectric 99 from the inner electrode 97. Each discharger 85 is provided with a protruding contact terminal 101 having a head 102 thereon riding within the inner insulating sleeve 96 and held from displacement by the inwardly turned flange 103 formed on the latter. Head 102 bears against coil spring 104 disposed between the same and the carbon electrode 97.

If a particular pair of customer's terminal posts 14 and the drop wires 46 connected thereto should have protection, it is only necessary then to insert the bottom type discharger or arrester 85 in the pair of spring fingers 82 disposed directly over this pair of terminal posts. This can be easily done by sliding head 92 between spring fingers 82 and the tapering wall of the corresponding recess 91 in cover 45. As illustrated in Fig. 8, this action causes the spring fingers 82 to be flexed outwards slightly to allow this tapered head 92 to slip down and into this recess 91 as illustrated in Fig. 9. Spring fingers 82 then resiliently snap back into position to engage the wall of cover 45 at the corner 106, so to speak, formed at the entrance of this recess 91. In this manner, considerable equipment may be saved or not put into use unnecessarily because only such subscribers' lines as require protection may be provided with dischargers or arresters 85.

When cover 45 is brought to closed position, as illustrated in Fig. 4, and the spring latches 72 have their loops 73 engage over curved fingers 74 of clip 75, as illustrated in Figs. 1 and 4, to bring the cover tightly in closed position, protruding electrodes 101 are brought into spring pressed relation with the terminal posts directly thereunder and therefore in good contact therewith. These electrodes 101 bear against coil springs 104 within the arresters which assure that good contact is maintained. Moreover, coil springs 104 maintain a relatively uniform spark gap 100 because these coil springs function to keep the electrodes 97 and 98 firmly pressed toward each other with the dielectric ring 99 acting as a uniform spacer therebetween.

It will be observed that spring plate 80, formed in the manner illustrated and described, provides a very simple and efficient form of mounting for removable dischargers or arresters 85 in the type of terminal unit herein disclosed. In actual practice, these arresters 85 have been found to very effectively provide the necessary protection of customers' lines against abnormal high voltage currents.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A cable terminal comprising a housing having a cover therefor pivotally mounted to swing in a direction normal to the longitudinal dimension of said housing and a chamber therein, terminal posts in said chamber adapted to receive service wires entering said housing, a cable having a plurality of conductors entering said housing and said chamber and being connected in said chamber to said terminal posts, a plurality of arresters, each arrester being provided with a spring-pressed electrode to yieldably press against one of said terminal posts, and a plurality of pairs of spring fingers carried on the inside of said cover, each for removably receiving and holding one end of each arrester against the inside face of said housing cover whereby said arrester electrodes will swing against and yieldingly engage said terminal posts automatically upon the closing of said cover.

2. A cable terminal comprising a housing having a cover therefor pivotally mounted to swing in a direction normal to the longitudinal dimension of said housing, a container provided with a chamber therein disposed in said housing, terminal posts in said chamber projecting from one wall thereof adapted to receive service wires entering said housing, a cable having a plurality of conductors entering said housing and said chamber and being connected in said chamber to said terminal posts, a plurality of arresters, each arrester being provided with a spring-pressed electrode to yieldably press against one of said terminal posts, and a plate secured to the inside of said housing cover, said plate having a plurality of pairs of spring fingers provided along its longitudinal edges, each pair being formed to removably receive and hold one of said arresters and to provide a ground connection therefor whereby said arrester electrodes will swing against and yieldingly engage said terminal posts automatically upon the closing of said cover.

3. A cable terminal comprising a housing and a cover therefor, a plurality of terminal posts in said housing for receiving a plurality of line conductors and service wires adapted to enter said housing, a plurality of arresters, each arrester being provided with an electrode at one end to press against one of said terminal posts and a mounting head at the opposite end, said cover having a recessed portion for each mounting head, and a pair of spring fingers carried by said cover for holding each mounting head removably seated in its said recessed portion.

4. A cable terminal comprising a housing and a cover therefor, a plurality of terminal posts in said housing for receiving a plurality of line conductors and service wires adapted to enter said housing, a plurality of arresters, each arrester being provided with an electrode to press against one of said terminal posts and a mounting head thereon, said cover having a recessed portion for each mounting head, spring fingers carried by said cover for holding each mounting head removably seated in its said recessed portion, a plate integral with said fingers, and means for securing said plate to the inside face of said cover.

References Cited in the file of this patent

UNITED STATES PATENTS

| | | |
|---|---|---|
| 1,213,157 | Conway | Jan. 23, 1917 |
| 1,625,163 | Schurr | Apr. 19, 1927 |
| 2,056,917 | Booth | Oct. 6, 1936 |
| 2,126,891 | Kelsay | Aug. 16, 1938 |
| 2,464,524 | Nathan | Mar. 15, 1949 |
| 2,507,363 | Baker | May 9, 1950 |
| 2,559,009 | Coyle | July 3, 1951 |
| 2,742,665 | Stopek | Apr. 24, 1956 |